Oct. 21, 1952     W. J. JACOBSSON ET AL     2,614,573
AIRCRAFT BREATHING OXYGEN REGULATOR
Filed May 5, 1945
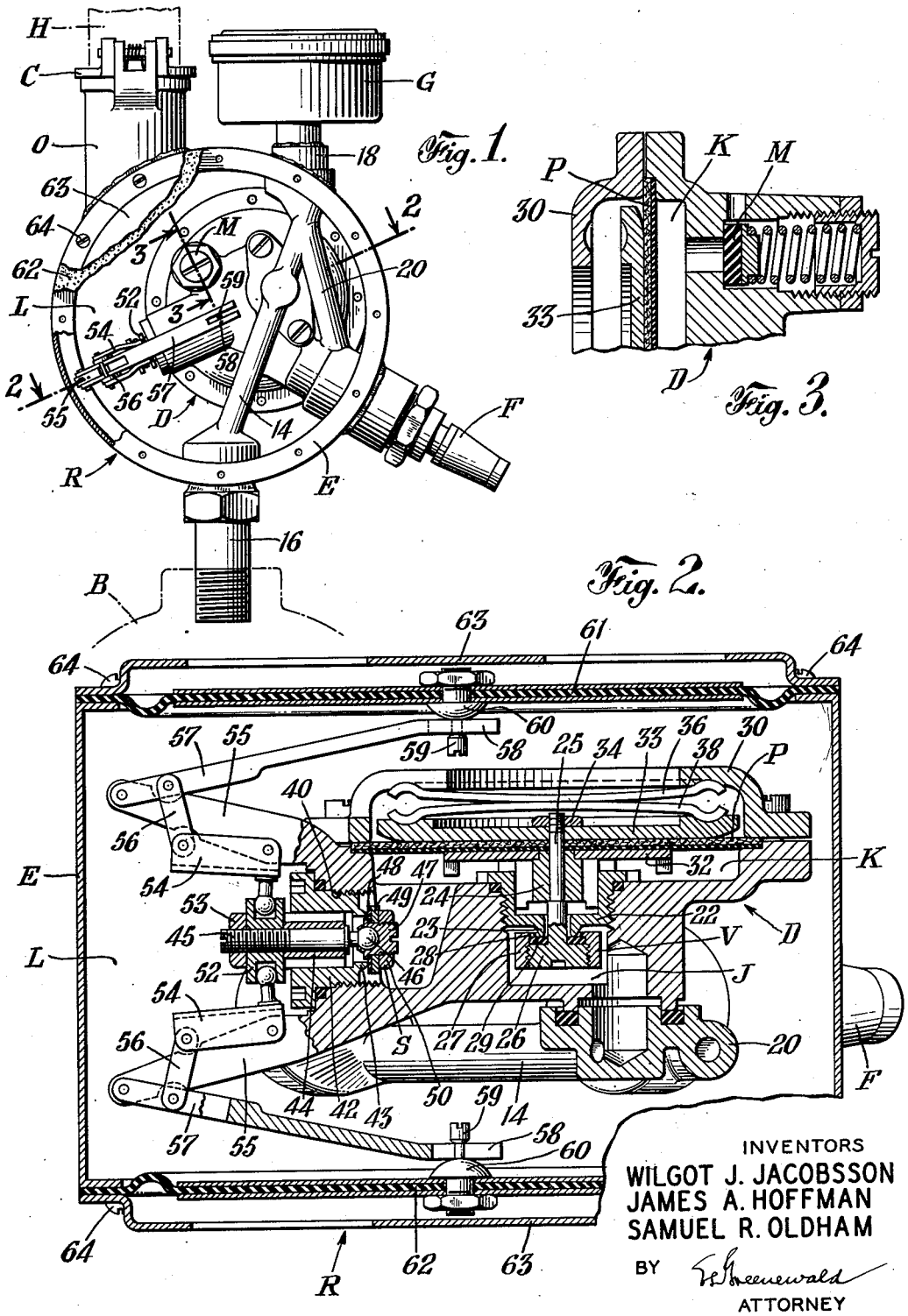
INVENTORS
WILGOT J. JACOBSSON
JAMES A. HOFFMAN
SAMUEL R. OLDHAM
BY *Greenewald*
ATTORNEY Patented Oct. 21, 1952

2,614,573

UNITED STATES PATENT OFFICE 2,614,573

AIRCRAFT BREATHING OXYGEN REGULATOR

Wilgot J. Jacobsson, Plainfield, James A. Hoffman, Roselle, and Samuel R. Oldham, West Orange, N. J., assignors, by mesne assignments, to Union Carbide and Carbon Corporation, a corporation of New York Application May 5, 1945, Serial No. 592,212

6 Claims. (Cl. 137—64)

This invention relates to fluid pressure regulators, and more particularly to aircraft breathing oxygen regulators of the demand type.

These regulators are preferably employed at high altitudes, for bail-out service, or as an independent unit whereby the wearer can walk around the personnel compartment of an aircraft without being connected to the oxygen supply system.

An object of the present invention is to provide a light-weight, compact, and reliable pressure regulator for this purpose.

Another object is to provide a pressure responsive valve which is substantially free from creep or the escape of fluid past the valve when closed, by insuring alignment or parallelism between the stationary and movable valve parts when closed.

Other objects and features of novelty will be apparent as the following description proceeds, with reference to the accompanying drawings, in which:

Fig. 1 is a front elevation of the regulator according to the preferred embodiment of the present invention, one side of the diaphragm being removed to show the internal construction;

Fig. 2 is a diametrical section taken along the line 2—2 of Fig. 1; and

Fig. 3 is a detail section along the line 3—3 of Fig. 1.

As shown in the drawings, the regulator R is directly connected to a bottle B which is a portable flask or cylinder for storing a suitable supply of oxygen under pressure. A quick disconnect fitting F is provided for filling or recharging the bottle B. An inlet pressure gauge G is mounted on the regulator R and is connected with both the bottle B and the fitting F. An outlet O for the regulator R is provided with a spring pressed hinged cover C which when open may be connected to the flexible hose H of the breathing mask. This assembly is supported by suitable straps or the like, whereby it is attached to the body of the breather, so that he carries the apparatus about with him as a complete independent breathing unit.

The regulator has an internal body D preferably a casting of aluminum or other light metal or plastic suitably cored or machined to provide the desired passages and chambers. The body D is mounted inside a casing E which is preferably of sheet metal in cylindrical form.

Two stages of pressure reduction are used. The body D is formed to provide an inlet pressure or high-pressure chamber J and an intermediate pressure chamber K, one wall of which is formed by a diaphragm P. Pressure reduction between the chambers J and K is controlled by a first-stage valve V. The outlet or low pressure chamber L is formed between the outside of the body D and the inside of the casing E. Pressure reduction from the chamber K to the chamber L is controlled by a second-stage valve S.

The first-stage is a very small, compact, attached stem type regulator with a screened inlet to filter out dust and dirt and to protect the seat and stem. No valve closing spring is used, first because the stem is attached to the diaphragm, second because the pressure-adjusting spring can be made smaller and with a lower spring rate, and third, because the regulator is preset to a desired delivery pressure and consequently does not require sealing for no spring load.

The diaphragm P may be made of metal, but is preferably anode rubber or suitable synthetic rubber or kangaroo leather in combination with such rubber. These materials are chosen to give sufficient strength and satisfactory flexing at either high or low temperatures ($-70°$ F. to $+150°$ F.) which may be encountered in aircraft use.

No pressure adjusting means is employed, and the delivery pressure varies over a reasonable range, which is taken care of by the second-stage. A safety relief valve M is provided for protection of parts as well as to prevent the second-stage from becoming inoperative.

As shown in Fig. 1, the body D has a passage 14 extending from the fitting 16 which is connected to the bottle B, to the fitting 18 which is connected to the gauge G. The passage 14 communicates with a passage 20 which extends to the refilling fitting F.

As shown in Figure 2, the passage 14 leads to the first-stage or high-pressure chamber J formed by a bore in the body D. Threaded in the outer end of this bore is a nozzle member 22 which has a central reduced nozzle 23 formed at its lower end. The nozzle member 22 is hollow, having a central bore which slidably receives a fluted guide member 24. A valve stem 25 passes through the nozzle 22, and has a slotted head 26 screwed into a collar 27 having an inturned flange 28 which secures in position a gasket 2 forming the seat for the nozzle 23.

The diaphragm P is clamped at its margin between the rim of the intermediate chamber K and the rim of a cover 30. The upper end of the guide member 24 is secured to a backing plate 32 for the diaphragm P. The valve stem 25 passes through the guide member 24, the diaphragm itself, and an upper backing plate 33, the parts being secured together by nut 34 on the outer end of the valve stem.

Between the cover 30 and the upper backing plate 33 are mounted a pair of leaf springs 36 and 38, which are diametrically arranged contacting at their centers and bowed outwardly at their ends, which are rounded as shown to contact the respective margins of the cover 30 and the backing plate 33.

The second-stage is a double lever, double diaphragm arrangement operated by the suction created during the inhalation period by the person using the regulator. The second-stage valve S is built into a boss on the body D, and is of the attached stem type with nozzle seating, and a self-aligning seat which gives seating irrespective of misalignment of the parts. By the term "self aligning seat" is meant one of at least a slightly yieldable material whose sealing surface becomes parallel with its cooperating or mating sealing surface when merely moved into contact, whether or not the stationary sealing surface may be axially aligned with the valve axis and precisely normal or at right angles thereto. The first-stage and second-stage and levers are all one unit with the body D, which is readily inserted into the casing E.

The body D has a lateral bore 40 communicating with the chamber K. A nozzle member 42 for the second-stage is threaded into the bore 40 and terminates in a reduced nozzle 43. A fluted guide member 44 is slidable in a bore in the nozzle member 42. A valve stem 45 is secured inside the guide member 44 and terminates in a ball end 46. The rim of a stud 47 is crimped inwardly to provide a socket to loosely receive the ball end 46.

The seating face of this valve S is formed of anode rubber 48 which is backed by a washer 49 and a nut 50, the rubber 48 engaging a radial flange on the stud 47. The center of the ball 46 lies in the plane of the seating face of the nozzle when the valve is closed. The seat member may rotate as well as tilt about the center of the ball by reason of this universal joint.

The outer end of the valve stem 45 carries a circumferentially grooved operating collar 52 which is clamped against the guide 44 by a nut 53. The groove in collar 52 receives the ball ends of a pair of bell cranks 54 pivoted on struts 55 extending outwardly from the body D. The bell cranks are pivotally connected by links 56 to levers 57 pivoted on the outer ends of struts 55. The levers 57 terminate in slotted ends 58 which receive pins 59 extending outwardly from hemispherical bearing members 60 centrally mounted on substantially identical diaphragms 61 and 62 respectively closing the ends of the casing E and forming movable end walls of the low pressure chamber L. The two diaphragms are clamped to the casing E by perforated caps 63 held in place by screws 64. Each of the diaphragms 61 and 62 is externally exposed to the pressure of the atmosphere and they are movable equally in response to changes of pressure within the chamber L.

The slotted ends 58 allow freedom of movement of the levers 57 relatively to diaphragms 61 and 62, to prevent binding. By providing two lever systems and two diaphragms of equal weight, the gravity forces are directly opposed to each other, so that the delivery pressure is independent of the position of the regulator. The double diaphragm arrangement also doubles the force for operation of the valve S, which is important for breathing purposes because of the low suction requirements.

In operation, the apparatus being assembled and supported by the body of the person wearing the mask as described, when the breather inhales he breathes oxygen through the hose H and the outlet O from the low pressure chamber L, reducing the pressure therein. This draws both diaphragms 61 and 62 inwardly, and the bearing members 60 move the levers 57 inwardly which, through links 56 and bell cranks 54 and the ball ends thereof in the groove of collar 52, move the valve stem 45 inwardly, which moves the seat 48 clear of the nozzle 43, thus opening the second stage valve.

When the person exhales the increased pressure in chamber L forces the diaphragms 61 and 62 outwardly which reverses the operation and closes the second stage valve S. The pressure in chamber K increases which pressure then actuates diaphragm P to overcome the pressure of springs 36 and 38 and close the first stage valve V.

One advantage of this invention is the employment of leaf springs 36 and 38 in general parallelism with the diaphragm P to obtain greater compactness than is obtainable were a coil spring of similar character used.

Another advantage of this invention is the self-aligning valve S which substantially eliminates creep and enables the tightness of an expensive precision made valve to accrue in a less costly valve made in quantity production. This invention has a many hundred percent improvement in creep reduction to only an infinitesimal amount.

What is claimed is:

1. At least a two stage fluid pressure regulator comprising a body having therein at least two pressure responsive valves, a low pressure chamber enclosing said body and having diaphragms in and constituting opposite walls of said chamber, mechanism responsive to movement of said pair of diaphragms for controlling a low pressure valve in said body, a higher pressure diaphragm in said body, a higher pressure valve in said body responsive to movement of said higher pressure diaphragm, said higher pressure diaphragm being located between said first mentioned diaphragm and generally parallel to them.

2. A fluid pressure regulator comprising a body in which are located two reducing valves in series, a pressure responsive diaphragm for each actuating each valve, a low pressure chamber enclosing said body, the low pressure diaphragm constituting a wall of said chamber, a high pressure supply connection to said body, and a low pressure outlet connection from said chamber, the higher pressure diaphragm being between said body and lower pressure diaphragm.

3. A fluid pressure regulator comprising a body in which are located two reducing valves in series, a pressure responsive diaphragm for each actuating each valve, a low pressure chamber enclosing said body, the low pressure diaphragm constituting a wall of said chamber, a high pressure supply connection to said body, and a low pressure outlet connection from said chamber, the higher pressure diaphragm being between said body and lower pressure diaphragm and generally parallel thereto.

4. In a fluid pressure responsive valve, a casing having inlet and outlet passages, a valve between said passages, a pressure responsive member, and a stem slidable between said member and valve, said valve having a movable sealing surface actuated by said member and a substantially stationary sealing surface, the combination therewith of the improvement for substantially eliminating creep or pressure build-up in the outlet passage due to movement of fluid past the valve when closed, said improvement including the movable one of said sealing surfaces being free of any rigid connection with said stem holding it at a fixed angle thereto and mounted for easy tilting at least to some extent in any direction from a normal to a longitudinal valve axis about a center in the plane of the movable sealing surface, and one of said sealing surfaces being of a seating material that is at least slightly yieldable and the other sealing surface being more rigid, the valve stem being slidable without impeding the tilting of the movable one of said sealing surfaces, whereby said sealing surfaces engage on closing the valve to prevent creep.

5. A valve according to claim 4 in which the valve stem is connected to the movable sealing surface by a universal joint.

6. In a fluid pressure responsive valve provided with a movable seat member, a stationary member engaged by said seat, a slidable stem for actuating said seat member, pressure responsive means for moving said stem, an outlet passage for fluid from said valve, the combination therewith of the improvement insuring accurate closing of said valve irrespective of stem and seat alignment, said improvement comprising means for supporting and guiding the movement of one of said stem and seat with the other one of said stem and seat being free of any additional supporting and guiding means, and a yieldable connection between said stem and the seat in a plane of said seat, whereby a self aligning valve is provided free of creep.

WILGOT J. JACOBSSON.
JAMES A. HOFFMAN.
SAMUEL R. OLDHAM.

REFERENCES CITED

The following references are of record in the file of this patent:

UNITED STATES PATENTS

| Number | Name | Date |
|---|---|---|
| 571,346 | Dickerson et al. | Nov. 17, 1896 |
| 684,802 | Duck | Oct. 22, 1901 |
| 744,679 | Cook | Nov. 17, 1903 |
| 746,560 | McAdams | Dec. 8, 1903 |
| 1,150,779 | Lord | Aug. 17, 1915 |
| 2,119,471 | Mesinger | May 31, 1938 |
| 2,308,861 | Clifford | Jan. 19, 1943 |
| 2,313,149 | Jacobsson | Mar. 9, 1943 |
| 2,383,801 | Johnson | Aug. 28, 1945 |
| 2,399,054 | Meidenbauer | Apr. 23, 1946 |
| 2,406,888 | Meidenbauer | Sept. 3, 1946 |

FOREIGN PATENTS

| Number | Country | Date |
|---|---|---|
| 11,518 | Great Britain | of 1899 |
| 29,588 | Sweden | Oct. 1, 1910 |
| 118,462 | Australia | of 1944 |
| 765,525 | France | of 1933 |
| 817,684 | France | of 1936 |